United States Patent [19]

Watanabe et al.

[11] 3,969,084
[45] July 13, 1976

[54] COPPER-BASE BEARING MATERIAL CONTAINING CORROSION-RESISTANT LEAD ALLOY

[75] Inventors: Sakae Watanabe, Tokyo; Heihachiro Ohigawa, Funabashi, both of Japan

[73] Assignees: Nissan Motor Co., Ltd.; Nippon Dia Clevite Company, Limited, both of Japan

[22] Filed: May 21, 1974

[21] Appl. No.: 472,057

[30] Foreign Application Priority Data
June 1, 1973 Japan................................ 48-61607

[52] U.S. Cl................................. 29/182.1; 29/199; 75/200; 75/208 R
[51] Int. Cl.²............................................ B22F 3/00
[58] Field of Search.................. 29/182.1, 182, 199; 75/200, 208 R, 166 C, 156; 117/113

[56] References Cited
UNITED STATES PATENTS

| | | |
|---|---|---|
| 484,084 | 12/1891 | Bottome............................ 75/166 C |
| 1,743,303 | 1/1930 | Andrews............................ 75/166 C |
| 2,096,252 | 10/1937 | Koehring............................ 75/208 R |
| 2,198,240 | 4/1940 | Boegehold......................... 75/166 C |
| 2,372,202 | 3/1945 | Hensel et al........................ 29/182.1 |
| 2,517,132 | 8/1950 | Piper et al........................... 75/166 C |
| 2,986,464 | 5/1961 | Lewis et al......................... 29/182.1 |

FOREIGN PATENTS OR APPLICATIONS

| | | |
|---|---|---|
| 464,824 | 4/1937 | United Kingdom............... 75/166 C |
| 565,004 | 10/1944 | United Kingdom............... 75/166 C |

*Primary Examiner*—Arthur J. Steiner
*Attorney, Agent, or Firm*—Robert E. Burns; Emmanuel J. Lobato; Bruce L. Adams

[57] ABSTRACT

A Pb-base alloy containing 1 – 3% Sn and 0.5 – 3.5% Bi, allowing less than 2% Sb to be further contained, resists attack from acids formed in deteriorated lubricating oils. Either an alloy of Cu and the Pb-base alloy or a porous Cu mass impregnated with the Pb-base alloy is a highly corrosion-resistant bearing material, and the Pb-base alloy serves also as a direct overlay on a Cu-base bearing material due to negligible heat diffusion of Sn from the alloy.

3 Claims, 3 Drawing Figures

COPPER-BASE BEARING MATERIAL CONTAINING CORROSION-RESISTANT LEAD ALLOY

The present invention generally relates to copper-lead bearing materials, and more particularly to a bearing material composed of copper and a corrosion-resistant lead-base alloy.

Copper-lead alloys containing 10 to 55% lead have been widely used as plain bearing material for various machines. In particular, this type of alloy applied on a steel backing or shell holds a vital position in the field of high speed machine bearings such as main bearings and connecting rod bearings for internal combustion engines. As is known, however, such bearings are not satisfactorily protected from corrosion wear since the alloy, or more accurately lead in the alloy is gradually eroded by acids formed in a deteriorated lubricating oil. Especially in the case of an automobile engine using liquefied petroleum gas as fuel, high combustion temperatures compared with that of a gasoline engine accelerate the oxidation or acid formation in a motor oil which flows and splashes in the engine to lubricate and to cool the piston. Accordingly, corrosion of bearings is enhanced to such a degree that an ordinary copper-lead alloy may not serve the purpose.

In order to overcome such a drawback, it is known to apply a thin layer of a special alloy, which is excellent both in corrosion resistance to a deteriorated lubricating oil and in friction characteristic, on the surface of a copper-lead alloy bearing. Two typical examples of such alloy are lead-indium and lead-tin. Lead-indium, however, requires a complicated process to form an overlay in addition to the use of expensive indium. A lead-indium overlay is formed by initially plating the base material with lead, then plating the lead surface with indium, and finally heating the plated material to cause indium to diffuse into the lead layer.

A lead-tin alloy containing about 10% tin has a superior corrosion resistance as well as a good bearing characteristic, and can be prepared relatively easily. If, however, this alloy is coated directly on a copper-lead bearing material, the overlay shows a gradual deterioration in corrosion resistance and causes the copper-lead alloy to harden during use, because tin atoms in the overlay gradually diffuse or migrate into the copper region of the copper-lead alloy due to frictional heat to form bronze. An intermediate layer should be formed to prevent the diffusion by, for example, plating nickel prior to application of the overlay. As a result, bearing fabrication with this alloy also is accompanied with low productivity and high costs.

It is therefore an object of the present invention to provide a highly corrosion resistant bearing material which can be used without any overlay.

It is another object of the invention to provide a lead-base alloy which gives such a bearing material in combination with copper and, besides, serves as a direct overlay on a copper-lead bearing alloy.

According to the invention, 1 to 3% tin and 0.5 to 3.5% bismuth are introduced into lead to give a highly corrosion-resistant lead-base alloy for accomplishement of these objects. A bearing material according to the invention comprises 10 to 55% the lead-base alloy and the balance of copper. The material is in the form of either alloy or a copper mass sintered and impregnated with the lead-base alloy. A portion of tin and/or bismuth in the lead-base alloy may be replaced with antimony.

Other objects, features and advantages of the invention will become clear from the following detailed description with reference to the accompanying drawing, in which.

Figure 1:
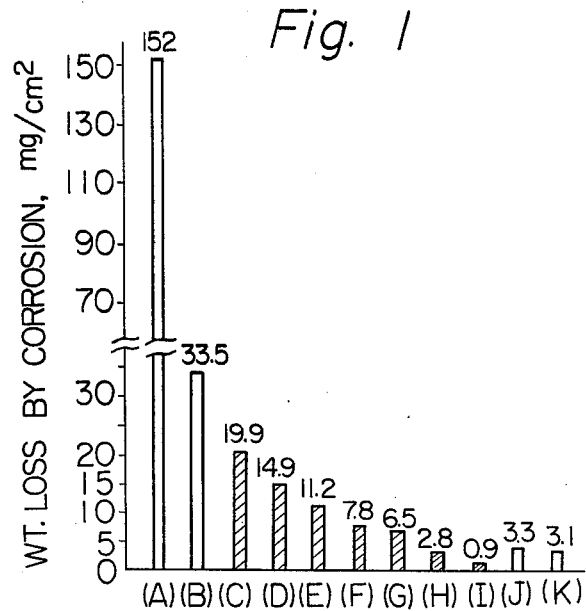
FIG. 1 is a graph showing corrosion resistance of lead-base alloys according to the invention and several conventional alloys.

The bar graph of FIG. 1 shows the result of a corrosion test carried out with respect to a lead-base alloy according to the invention in various compositions and several examples of conventional lead-base alloys. The ordinate represents the weight loss of the test pieces after 5 hr. immersion in a corrosive solution maintained at 141°C. The corrosive solution was prepared by dissolving 195 mg of lauric acid $CH_3(CH_2)_{10}COOH$ in 9765 ml of xylene $C_6H_4(CH_3)_2$ and 5 ml of nitrobenzene $C_6H_5NO_2$. The bars (A) to (K) of FIG. 1 represent the alloys shown in Table 1.

Table 1

| | | LEAD-BASE ALLOYS Composition | | | | |
|---|---|---|---|---|---|---|
| Type | Sn % | Bi % | Sb % | Cu % | Pb % | Note |
| (A) | 0.4 | — | — | — | 99.6 | Conventional alloy for impregnation of Cu |
| (B) | 2.0 | — | — | — | 98.0 | Conventional low Sn content alloy |
| (C) | 1.0 | 1.0 | 1.0 | — | 97.0 | According to the invention |
| (D) | 1.0 | 2.0 | — | — | 97.0 | " |
| (E) | 1.0 | 1.0 | 2.0 | — | 96.0 | " |
| (F) | 1.5 | 3.5 | — | — | 95.0 | " |
| (G) | 1.0 | 2.0 | 1.0 | — | 96.0 | " |
| (H) | 2.0 | 2.0 | — | — | 96.0 | " |
| (I) | 3.0 | 0.5 | 0.5 | — | 96.0 | " |
| (J) | 10.0 | — | — | — | 90.0 | Conventional alloy for overlay |
| (K) | 9.0 | — | — | 1.0 | 90.0 | " |

Figure 2:
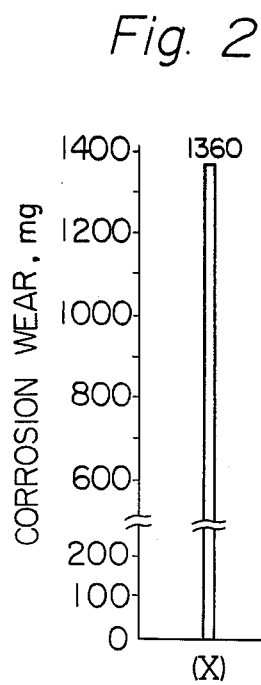
FIG. 2 is a graph showing the effect of a conventional intermediate layer on corrosion resistance.

As is known, corrosion resistance of lead to lubricating oils is improved by the addition of tin, and rises as the amount of tin is increased. The effect of tin content in lead-tin binary system can be seen from the bars (A), (B) and (J) of FIG. 1, which represent 0.4%, 2% and 10%, respectively. However, the afore-mentioned unfavorable behavior of tin in the system also is enhanced as the tin content increases if a suitable intermediate layer is not employed. An experiment was carried out under extremely severe conditions to show the effect of a nickel layer formed under a conventional overlay of the lead-tin alloy (J). The result is shown in FIG. 2, in which the bars (X) and (Y) represent the overlays without and with a nickel intermediate layer, respectively. As seen from the weight loss by corrosion in the case (X), which is more than thirty times as large as in the case (Y), a lead-tin alloy of high tin content has no practical use as a bearing material if no remedy for the diffusion of tin into a copper alloy is provided.

In a lead-base alloy of the invention, tin content is limited not to exceed 3% to avoid the above described diffusion. Corrosion resistance is maintained, or even increased by the addition of a small amount of bismuth. The effect of bismuth on corrosion resistance is remarkably enhanced when used in combination with a suitable amount of tin. The enhancement by the coexistence of tin and bismuth is far greater than a mere addition of the respective effects of them. Bismuth forms solid solution either with lead up to 10% bismuth content at room temperature or with tin up to 5%, but does not form solid solution with copper. Accordingly, bismuth in an alloy of the invention does not diffuse into a combined copper-base alloy even if heated by friction, while the diffusion of tin is practically negligible because of minimized tin content. Consequently, the excellent corrosion resistance of the lead-tin-bismuth alloy shows little deterioration during long use even when the alloy is used in the form of an overlay on a copper-base bearing with no intermediate layer of nickel. (D), (F) and (H) in Table 1 and FIG. 1 are examples of the ternary alloy of the invention. As seen from a comparison between (B) and (H), the addition of 2% bismuth into a 2% tin-98% lead system allows the weight loss by corrosion to decrease to about 1/12 of the original value. (H) is superior even to (J) and (K), which are conventional high tin-content alloys for overlay. It is also to be noted that (D) and (F) are more corrosion resistant than (B) despite decrease in tin content. The composition of the lead-base alloy of the invention may be freely varied within the ranges of 1 – 3% tin and 0.5 – 3.5% bismuth taking into account the intended use and costs. If tin is decreased below 1%, the effect of bismuth on corrosion resistance lowers sharply, but more than 3% of tin content causes a copper-base alloy to harden due to augmentation in the tin diffusion. Bismuth content should be at least 0.5% to attain an expected improvement on corrosion resistance due to an interaction with tin, but the effect of the interaction is scarcely enhanced even if more than 3.5% of bismuth is used.

In the above described alloy according to the invention, it is possible to replace a portion of tin or bismuth with antimony. Although antimony is less effective than tin or bismuth, the antimony replacement in an amount of about 0.5 – 2% gives less expensive alloys having an excellent bearing characteristic and corrosion resistance sufficient enough for use in ordinary bearings as seen form (C), (E), (G) and (I) in Table 1 and FIG. 1. Among them, (I) is superior to (J) and (K) and even to the above mentioned (H). Antimony of less than about 0.5% or more than 2% is of little meaning from the viewpoint of costs or efficiency.

In a first preferred embodiment of the invention, a bearing material is composed of the above described lead-base alloy and 45 to 90% copper. The lead-base alloy is used here as a superior substitute for commonly used lead. Similarly to conventional copper-lead bearing materials, such a bearing material of the invention may be either in the form of alloy or in the form of a copper mass sintered and impregnated with the lead-base alloy. The alloy form includes a sintered mass of a fine alloy powder.

The lead-base alloy of the invention is prepared similarly to conventional lead-tin alloys. Also, any conventional process for the preparation of copper-lead bearing materials can be employed with no substantial modification when a lead-base alloy of the invention is used in place of lead. In a casting method, for example, copper and the three metal elements (and antimony of necessary) for the lead-base alloy are fused together. The molten alloy may be cast into a bearing either with or without a steel shell. To obtain a sintered alloy mass, the molten alloy is injected into water or into a non-oxidizing atmosphere to give the so-called "atomized powder", and the powder is then sintered in a usual manner. In the preparation of another type of sintered material, a porous copper mass resulting from sintering of copper powder is impregnated with a molten lead-base alloy of the invention.

As another embodiment of the invention, a conventional copper-base bearing material, typically a copper-lead alloy, is directly coated with an overlay of the tin and bismuth-containing lead-base alloy of the invention. Such an overlay can be formed similarly to a conventional lead-tin overlay. For example, a sintered body of a copper-lead alloy is immersed in a molten lead-base alloy of the invention, followed by, for example, broaching to obtain an overlay of a predetermined thickness. The advantage of the invention will become more clear from the following example.

EXAMPLE

A connecting rod bearing for an automobile engine was fabricated by sintering a bearing material containing 50% Cu, 48% Pb, 1% Sn and 1% Bi. The bearing material was prepared by impregnating sintered copper with an equal amount of the lead-base alloy (H) in Table 1 and FIG. 1. The bearing was provided with a steel shell but with no overlay, and was finished to the following dimension: 59.4 mm in outer diameter, 56.25 mm in inner diameter, and 13.5 mm in width. For comparison, a similar bearing was fabricated out of a conventional material containing 50% Cu, 49.6% Pb and 0.4% Sn. This material was prepared from 1 part of Cu and 1 part of a conventional alloy for impregnation, 99.2% Pb-0.8% Sn. The two kinds of bearings were subjected to a practical dynamic test under the following conditions.

| | |
|---|---|
| Load: | 500 kg/cm² |
| Hardness of the shaft: | 22–23 in Rockwell scale C |
| Lubricating oil: | PCV motor oil, SAE 20W-20 |
| Temperature of the bearing rear face: | 140°C |
| Temperature of supplied oil: | 120°C |
| Revolution rate of the shaft: | 3500 rpm |
| Operation hours: | 65 hr. |

Thickness and weight of the bearings were measured before and after the test, and the data are shown in Table 2.

Table 2

EXPERIMENTAL DATA ON THE TESTED BEARINGS

| Location of bearing | | | Bearing material Conventional material | Material of the invention |
|---|---|---|---|---|
| Thickness, central region (mm) | Rod-side | Before test | 1.574 | 1.575 |
| | | After test | 1.573 | 1.575 |
| | | Difference | –0.001 | 0 |
| | Cap-side | Before test | 1.572 | 1.576 |
| | | After test | 1.572 | 1.575 |
| | | Difference | 0 | –0.001 |
| Weight (g) | Rod-side | Before test | 28.6285 | 28.1948 |
| | | After test | 28.6072 | 28.1845 |
| | | Difference | –0.0213 | –0.0103 |
| | Cap-side | Before test | 28.6312 | 27.8690 |
| | | After test | 28.6090 | 27.8591 |
| | | Difference | –0.0222 | –0.0099 |

The thickness was substantially unchanged with both samples due to the relatively short test hours, but there was a significant difference in the weight loss between the bearing made of the material of the invention and that of the conventional material. The weight loss of the former was less than ½ of the latter. The result of this test shows that the lead-tin-bismuth alloy of the invention is remarkably resistant to corrosion wear in practical use compared with the conventional lead-tin alloy since only the kind of the lead-base alloy was differentiated in the comparative test.

When a bearing is subjected to a prolonged operation, corrosion of a conventional lead-base alloy such as used in the above test is drastically accelerated by a progressive deterioration of a lubricating oil if no overlay is provided. After a few thousand hours, such a bearing is eroded almost to the entire thickness of the alloy layer (usually lying in the range 0.5 ± 0.2 mm), causing the lead regions in the alloy layer to be hollowed. Due to resulting decrease in mechanical strength, the alloy layer can no longer withstand the bearing pressure and is excessively distorted or transformed until outbreak of collapse or partial detachment.

Figure 3:
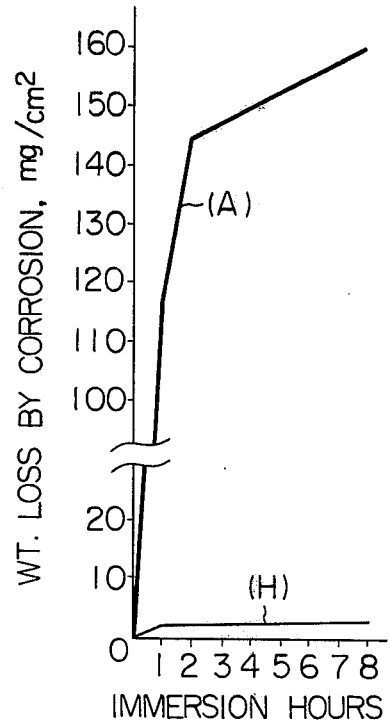
FIG. 3 is a graph showing the rate of corrosion progress with respect to an alloy of the invention and a conventional alloy.

Compared with such a serious erosion in a conventional bearing alloy, the lead-base alloy of the invention can resist attack from acids for a far longer period. It will be easily understood from FIG. 1 and Table 2 that a bearing material of the invention will not be eroded to give hollow regions even if it is subjected to use for tens times as long as the above mentioned thousands of hours. FIG. 3 is presented to illustrate an extremely slow rate of corrosion progress in a lead-base alloy of the invention. A test piece of the alloy (H) (96% Pb-2% Sn-2% Bi) of Table 1 was immersed in the corrosive solution described relating to FIG. 1 together with a test piece of the alloy (A) (99.6% Pb-0.4% Sn) for comparison, and the weight loss was measured every other hour. It is apparent that most of the large weight loss of the conventional alloy (A) occurs during the first two hours. After that, however, there is still a great difference in the rate of corrosion progress between the alloys (A) and (H). Calculated weight loss values per unit time during the subsequent six hours are about 0.15 and 2.66mg/cm$^2$/hr with (H) and (A), respectively. In other words, the rate of corrosion progress during long use of the alloy (H) is less than 1/17 of the alloy (A).

What is claimed is:

1. A bearing material consisting essentially of 45 to 90% of a sintered mass of copper powder impregnated with 10 to 55% of an alloy consisting of essentially 1 to 3% Sn, 0.5 to 3.5% Bi and the balance of Pb.

2. A bearing material according to claim 1, wherein said alloy further contains up to 2% Sb.

3. A bearing material according to claim 1, wherein said alloy consists essentially of 96% Pb, 2% Sn and 2% Bi.

* * * * *